(12) United States Patent
Maniktala

(10) Patent No.: US 11,303,162 B2
(45) Date of Patent: *Apr. 12, 2022

(54) FOREIGN OBJECT DETECTION IN WIRELESS POWER TRANSFER BY ASYMMETRY DETECTION

(71) Applicant: ChargEdge, Inc., Fremont, CA (US)

(72) Inventor: Sanjaya Maniktala, Fremont, CA (US)

(73) Assignee: ChargEdge, Inc., Fremont, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/793,972

(22) Filed: Feb. 18, 2020

(65) Prior Publication Data

US 2020/0328626 A1 Oct. 15, 2020

Related U.S. Application Data

(63) Continuation of application No. 15/967,912, filed on May 1, 2018, now Pat. No. 10,566,848.

(Continued)

(51) Int. Cl.
*H02J 50/60* (2016.01)
*G01V 3/10* (2006.01)
(Continued)

(52) U.S. Cl.
CPC ............. *H02J 50/60* (2016.02); *G01V 3/104* (2013.01); *H02J 50/10* (2016.02); *H02J 7/025* (2013.01); *H02J 50/12* (2016.02)

(58) Field of Classification Search
CPC .. H02J 50/60; H02J 50/10; H02J 50/12; H02J 7/025; G01V 3/104
(Continued)

(56) References Cited

U.S. PATENT DOCUMENTS 8,629,577 B2 * 1/2014 Azancot ................. H02J 50/90
307/104
9,354,620 B2 5/2016 Ben-Shalom et al.
(Continued)

*Primary Examiner* — Alfonso Perez Borroto
(74) *Attorney, Agent, or Firm* — White & Case LLP

(57) ABSTRACT

In one embodiment, a wireless power transfer system comprises a transmitter coil structure comprising a first transmitter coil, and a second transmitter coil coupled to the first transmitter coil in such a way that when a first current flows in the first transmitter coil in a first spatial direction the first current flows in the second transmitter coil in a second spatial direction different from the first spatial direction, a foreign object sensor coil structure comprising a first sensor coil having a central axis in common with the first transmitter coil, and a second sensor coil coupled in series to the first sensor coil, the second sensor coil having a central axis in common with the second transmitter coil, the first sensor coil coupled to the second sensor coil in such a way that when a first voltage induced in the first sensor coil has a first polarity a second voltage induced in the second sensor coil has a second polarity different from the first polarity, a voltage detector coupled to the foreign object sensor coil structure, the voltage detector configured to detect a net voltage across the foreign object sensor coil structure, and a controller configured to receive the net voltage and determine a presence or absence of a foreign object based on a magnitude of the net voltage.

19 Claims, 5 Drawing Sheets

Related U.S. Application Data

(60) Provisional application No. 62/492,956, filed on May 2, 2017.

(51) Int. Cl.
  *H02J 50/10* (2016.01)
  *H02J 7/02* (2016.01)
  *H02J 50/12* (2016.01)

(58) Field of Classification Search
  USPC .......................................................... 307/104
  See application file for complete search history.

(56) References Cited

U.S. PATENT DOCUMENTS

| | | | |
|---|---|---|---|
| 9,553,485 B2 | 1/2017 | Singh et al. | |
| 9,837,846 B2 * | 12/2017 | Partovi | H02J 7/0029 |
| 9,837,861 B2 * | 12/2017 | Choi | H02J 50/12 |
| 9,892,848 B2 | 2/2018 | Omae et al. | |
| 10,658,847 B2 * | 5/2020 | Peralta | H02J 7/025 |
| 2009/0096413 A1 * | 4/2009 | Partovi | H01F 27/36 |
| | | | 320/108 |
| 2013/0069441 A1 | 3/2013 | Verghese et al. | |
| 2014/0015334 A1 | 1/2014 | Jung et al. | |
| 2014/0266031 A1 * | 9/2014 | Sasaki | H02J 50/40 |
| | | | 320/108 |
| 2016/0336760 A1 | 11/2016 | Yamamoto et al. | |

\* cited by examiner

FOREIGN OBJECT DETECTION IN WIRELESS POWER TRANSFER BY ASYMMETRY DETECTION

CROSS-REFERENCE TO RELATED APPLICATIONS

This application is a continuation of U.S. patent application Ser. No. 15/967,912 filed on May 1, 2018, which claims the benefit of U.S. Provisional Application No. 62/492,956, entitled "Foreign Object Detection in Wireless Power Transfer by Asymmetry Detection", filed on May 2, 2017, each of which is incorporated by reference in their entirety.

FIELD OF THE INVENTION

The invention relates generally to wireless power transfer and more particularly to foreign object detection in wireless power transfer by asymmetry detection.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone or tablet.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Wireless power transfer transmitters commonly have a flat or concave surface on which devices to be charged are placed. Objects other than devices that can be wirelessly charged are sometimes placed on the charging surface of a wireless power transmitter, whether intentionally or inadvertently. Certain metal objects such as coins, paper clips, and keys can develop eddy currents in response to the varying magnetic field produced by the wireless power transmitter. Such "foreign objects" cause losses in the power being transferred to a wirelessly-chargeable device. Also, if left on the surface of the transmitter for a period of time, the eddy currents can cause the foreign metal object to overheat, potentially causing burns or igniting a fire.

The foreign object detection technique set forth in the Qi standard compares the amount of power transmitted by the transmitter and the amount of power that the wireless power receiver reports back to the transmitter. The difference between the two values is a loss number. Eddy currents that develop in a foreign object, such as a coin, on the transmitter surface will cause the loss number to increase. If the loss number exceeds a predetermined threshold, an indicator such as a light emitting diode may be triggered while the transmitter continues to transmit power. If the loss number exceeds the predetermined threshold for a predetermined amount of time, for example ten seconds, the transmitter will stop transmitting power. A drawback of this method of foreign object detection relates to inaccuracy in determining the actual amount of power transmitted or received. For example, a Qi-compliant transmitter indirectly estimates the AC power transmitted by the coil by sensing the DC voltage and current input to the transmitter, which can cause over 300 mW of error at 5 W. In other words, based on the input DC values, when a Qi transmitter determines that it is transmitting 5 W, the actual power may be a value between 4.7 W to 5.3 W. Similarly, a Qi-compliant receiver also indirectly estimates the AC power reaching its coil by sensing the output DC voltage and current, which can cause an error of 300 mW at 5 W. These errors at the transmitter and receiver can compound such that a foreign object escapes detection. For example, a Qi transmitter may be transmitting 5.3 W of power and the Qi receiver may be receiving 4.7 W of power, so the actual power loss is 600 mW, which can be caused by a coin or other foreign object on the transmitter absorbing the 600 mW. But because of errors both the transmitter and receiver sense that the power being transferred is 5 W, so the loss number is determined to be zero and the transmitter keeps operating. Absorbing 600 mW of power can raise the temperature of a coin to a potentially unsafe level. This problem becomes even more potentially dangerous for systems operating at higher power levels such as 10 W. Assuming the same percentage of error, the transmitter and receiver would each have a sensing error of 0.6 W, which could lead to a total power loss of 1.2 W going undetected. A coin on the transmitter absorbing 1.2 W of power going undetected can rise to a temperature that is a definite fire hazard. This inaccuracy in sensing transferred power is a major drawback that prevents Qi-compliant systems from safely delivering more than 5 W. Thus there is a need for an improved technique for detecting foreign objects on wireless power transmitters.

SUMMARY

In one embodiment, a wireless power transfer system comprises a transmitter coil structure comprising a first transmitter coil, and a second transmitter coil coupled to the first transmitter coil in such a way that when a first current flows in the first transmitter coil in a first spatial direction the first current flows in the second transmitter coil in a second spatial direction different from the first spatial direction, a foreign object sensor coil structure comprising a first sensor coil having a central axis in common with the first transmitter coil, and a second sensor coil coupled in series to the first sensor coil, the second sensor coil having a central axis in common with the second transmitter coil, the first sensor coil coupled to the second sensor coil in such a way that when a first voltage induced in the first sensor coil has a first polarity a second voltage induced in the second sensor coil has a second polarity different from the first polarity, a voltage detector coupled to the foreign object sensor coil structure, the voltage detector configured to detect a net voltage across the foreign object sensor coil structure, and a controller configured to receive the net voltage and determine a presence or absence of a foreign object based on a magnitude of the net voltage.

In one embodiment, the controller is configured to determine the presence of the foreign object when the magnitude of the net voltage is greater than a predetermined threshold and determine the absence of the foreign object when the magnitude of the net voltage is not greater than the predetermined threshold. In one embodiment, the wireless power transfer system further comprises a power circuit coupled to the transmitter coil structure, the power circuit configured to provide power to the transmitter coil structure. In one embodiment, the controller is further configured to cause the power circuit to halt providing power to the transmitter coil structure upon determining the presence of the foreign object. In one embodiment, the wireless power transfer system further comprises an output device, and the controller is further configured to cause the output device to generate a user-perceivable output upon determining the presence of the foreign object. In one embodiment, the wireless power transfer system further comprises a transmitting surface overlying the transmitter coil structure and the foreign object sensor coil structure. In one embodiment, the voltage detector comprises a sense resistor coupled to the foreign object sensor coil structure. In one embodiment, the wireless power transfer system further comprises a layer of magnetic material underlying the transmitter coil structure and the foreign object sensor coil structure.

In one embodiment a method for detecting foreign objects on a wireless power transfer device comprises providing power to a transmitter coil structure comprising a first transmitter coil, and a second transmitter coil coupled to the first transmitter coil in such a way that when a first current flows in the first transmitter coil in a first spatial direction the first current flows in the second transmitter coil in a second spatial direction different from the first spatial direction, detecting a net voltage across a foreign object sensor coil structure, the foreign object sensor coil structure comprising a first sensor coil having a central axis in common with the first transmitter coil, and a second sensor coil coupled in series to the first sensor coil, the second sensor coil having a central axis in common with the second transmitter coil, the first sensor coil coupled to the second sensor coil in such a way that when a first voltage induced in the first sensor coil has a first polarity a second voltage induced in the second sensor coil has a second polarity different from the first polarity, comparing the net voltage to a predetermined threshold, and determining presence or absence of a foreign object based on a result of comparing the net voltage to the predetermined threshold.

In one embodiment, determining presence of the foreign object comprises determining that the net voltage is greater than the predetermined threshold. In one embodiment, determining absence of the foreign object comprises determining that the net voltage is not greater than the predetermined threshold. In one embodiment, the method further comprises halting providing power to the transmitter coil structure in response to determining the presence of the foreign object. In one embodiment, the method further comprises generating a user-perceivable output in response to determining the presence of the foreign object.

In one embodiment, a system for detecting foreign objects on a wireless power transmitter comprises a foreign object sensor coil structure comprising a first sensor coil, and a second sensor coil coupled in series to the first sensor coil, the first sensor coil coupled to the second sensor coil in such a way that when a first voltage induced in the first sensor coil has a first polarity a second voltage induced in the second sensor coil has a second polarity different from the first polarity, a voltage detector coupled to the foreign object sensor coil structure, the voltage detector configured to detect a net voltage across the foreign object sensor coil structure, and a controller configured to receive the net voltage and determine a presence or absence of a foreign object based on a magnitude of the net voltage. In one embodiment, the controller is configured to determine the presence of the foreign object when the magnitude of the net voltage is greater than a predetermined threshold and determine the absence of the foreign object when the magnitude of the net voltage is not greater than the predetermined threshold. In one embodiment, the system further comprises an output device, and the controller is further configured to cause the output device to generate a user-perceivable output upon determining the presence of the foreign object. In one embodiment, the system further comprises a transmitting surface overlying the foreign object sensor coil structure. In one embodiment, the voltage detector comprises a sense resistor coupled to the foreign object sensor coil structure. In one embodiment, the system further comprises a layer of magnetic material underlying the foreign object sensor coil structure.

DETAILED DESCRIPTION

Figure 1:
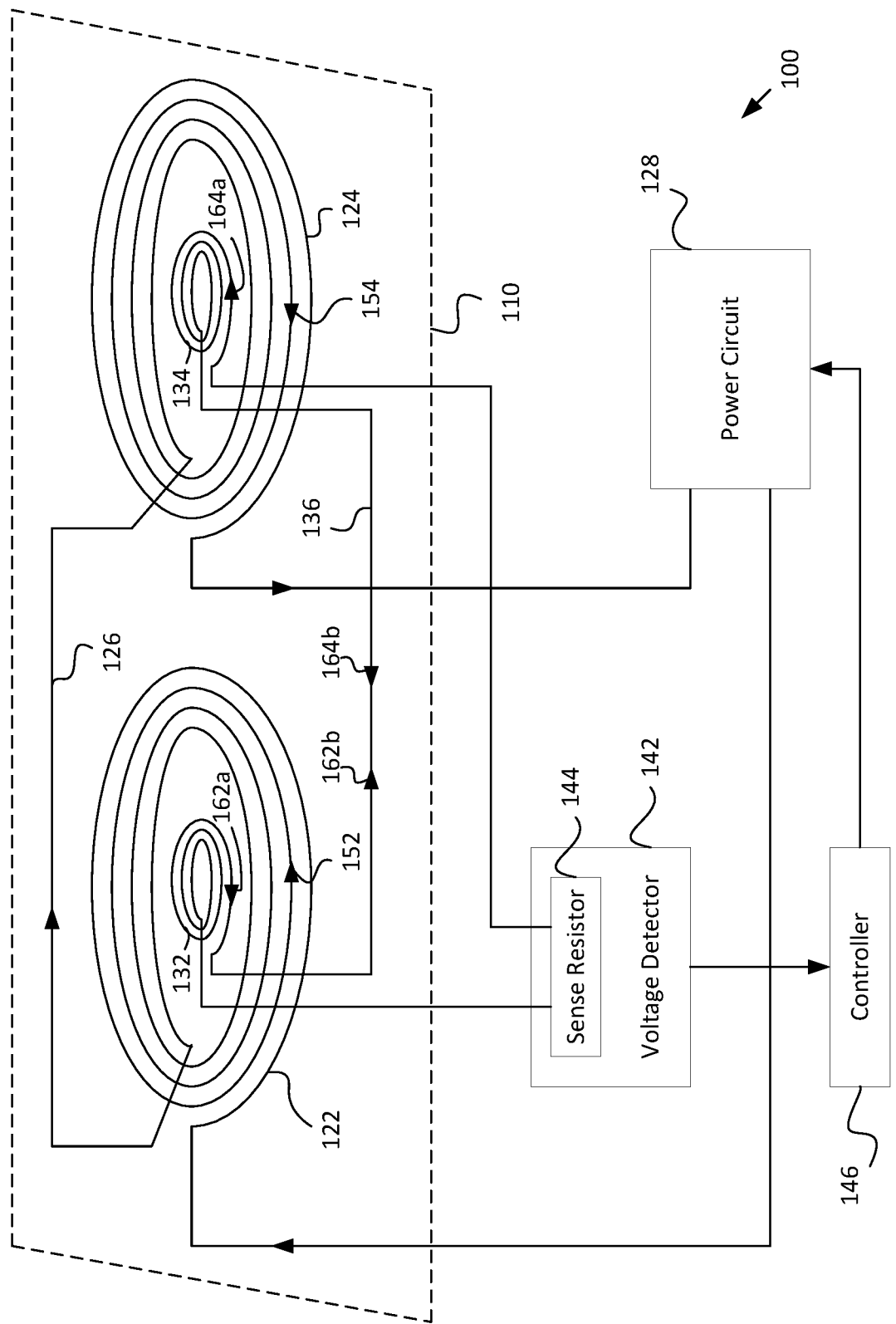
FIG. 1 is a diagram of one embodiment of a wireless power transmitter including a foreign object detection system, according to the invention.

FIG. 1 is a diagram of one embodiment of a wireless power transmitter 100 including a foreign object detection system, according to the invention. Transmitter 100 includes but is not limited to a transmitter coil structure including a first transmitter coil 122 and a second transmitter coil 124, a power circuit 128 coupled to the transmitter coil structure, a foreign object sensor coil structure including a first sensor coil 132 and a second sensor coil 134, a voltage detector 142 coupled to the foreign object sensor coil structure, and a controller 146. In the FIG. 1 embodiment, transmitter 100 also includes a substantially planar layer 110 of magnetic material underlying the transmitter coil structure (first transmitter coil 122 and second transmitter coil 124) and the foreign object sensor coil structure (first sensor coil 132 and second sensor coil 134). Magnetic layer 110 can be made of ferrite or any other magnetic material known in the art. In one embodiment, magnetic layer 110 is substantially planar. In other embodiments, magnetic layer 110 includes one or more raised portions, for example raised portions in areas enclosed by first transmitter coil 122 and second transmitter coil 124, raised portions in areas enclosed by first sensor coil 132 and second sensor coil 134, and/or a raised portion in an area between first transmitter coil 122 and second transmitter coil 124. In one embodiment, first transmitter coil 122 and second transmitter coil 124 have the same number of turns, substantially the same area, and are wound in the same direction. In the FIG. 1 embodiment, first transmitter coil 122 and second transmitter coil 124 are both wound in the clockwise direction. First transmitter coil 122 is coupled to second transmitter coil 124 through a pathway 126 in such a way that when a current is flowing in first transmitter coil 122 in a first spatial direction (e.g., counter-clockwise), a current is flowing in second transmitter coil 124 in a second spatial direction (e.g., clockwise). In one embodiment, first sensor coil 132 and second sensor coil 134 have the same number of turns, substantially the same area, and are wound in the same direction. In the FIG. 1 embodiment, first sensor coil 132 and second sensor coil 134 are both wound in the clockwise direction. First transmitter coil 122, second transmitter coil 124, first sensor coil 132, and second sensor coil 134 can be formed of wire or traces on a printed circuit board using conductive material such as copper, gold, or any other conductive material known in the art.

Power circuit 128 generates an AC signal that provides power to first transmitter coil 122 and second transmitter coil 124. The AC signal may be, but is not limited to, a square wave, a sinusoidal wave, a triangular wave, or a sawtooth wave. In one embodiment, power circuit 126 includes a resonant capacitor. Controller 146 sends one or more control signals to power circuit 128 to control when the AC signal is applied to the transmitter coil structure and to control the parameters (e.g., magnitude and frequency) of the AC signal. When a current 152 flows through first transmitter coil 122 in a counter-clockwise spatial direction as shown in FIG. 1, the counter-clockwise flow of current 152 through first transmitter coil 122 generates a magnetic field. According to the "right-hand-rule," the counter-clockwise flow of current 152 through first transmitter coil 122 causes flux lines (not shown) of the magnetic field to flow in an upward spatial direction. When a current 154 flows through second transmitter coil 124 in a clockwise spatial direction as shown in FIG. 1, the clockwise flow of current 154 through second transmitter coil 124 generates a magnetic field. According to the "right-hand-rule," the clockwise flow of current 154 through second transmitter coil 124 causes flux lines (not shown) of the magnetic field to flow in a downward spatial direction.

In the FIG. 1 embodiment, first transmitter coil 122 is coupled in series with second transmitter coil 124 in such a way that at a given point in time current 152 is equivalent in magnitude to current 154 but flows in an opposite spatial direction. If first transmitter coil 122 and second transmitter coil 124 are substantially identical, the flow of current 152 through first transmitter coil 122 generates a magnetic field substantially equivalent in magnitude to the magnetic field generated by the flow of current 154 through second transmitter coil 124. Because current 152 and current 154 are flowing in opposite spatial directions at any given point in time, the magnetic field generated by current 152 has a different polarity than the magnetic field generated by current 154. Although in the embodiment of FIG. 1 first transmitter coil 122 and second transmitter coil 124 are coupled together in series, in other embodiments first transmitter coil 122 and second transmitter coil 124 are coupled together in parallel to achieve the same result of magnetic fields with opposite polarities. Embodiments of an opposite polarity coil transmitter are further described in U.S. patent application Ser. No. 15/082,533, entitled "Wireless Power Transfer Using Multiple Coil Arrays," the subject matter of which is hereby incorporated by reference in its entirety.

First sensor coil 132 shares a common central axis with first transmitter coil 122, and second sensor coil 134 shares a common central axis with second transmitter coil 124. In one embodiment, first sensor coil 132 and second sensor coil 134 have the same number of turns, substantially the same area, and are wound in the same direction. The magnetic field generated by first transmitter coil 122 induces a first sensor voltage in first sensor coil 132, and the magnetic field generated by second transmitter coil 124 induces a second sensor voltage in second sensor coil 134. For example, as shown in FIG. 1, when current 152 is flowing in first transmitter coil 122, by Faraday's law of induction, a voltage is induced in first sensor coil 132 having a polarity that generates a magnetic field that attempts to oppose the flux generated by first transmitter coil 122, so an induced current 162a would flow in a clockwise spatial direction in first sensor coil 132. Similarly, when current 154 is flowing in second transmitter coil 124, by Faraday's law of induction, a voltage is induced in second sensor coil 134 having a polarity that generates a magnetic field that attempts to oppose the flux generated by second transmitter coil 124, so an induced current 164a would flow in a counter-clockwise spatial direction in second sensor coil 134. First sensor coil 132 is coupled to second sensor coil 134 by a pathway 136 such that a first induced current 162b (substantially the same as induced current 162a) flows in a direction opposite to a second induced current 164b (substantially the same as induced current 164a). Typically, under steady conditions, with no wireless power receiver present or with one or more wireless power receiver coils (such as the longitudinal receiver coils disclosed in U.S. patent application Ser. No. 15/448,196, the subject matter of which is hereby incorporated by reference in its entirety) are located symmetrically between first transmitter coil 122 and second transmitter coil 124, the magnitudes of first induced current 162b and second induced current 164b are substantially equal. As first induced current 162b and second induced current 164b are flowing in opposite directions and are substantially equal in magnitude, no net current flows in the foreign object sensor coil structure.

Voltage detector 142 is coupled to first sensor coil 132 and second sensor coil 134, and detects a net sensor voltage (i.e., the sum of the first sensor voltage and the second sensor voltage) across the foreign object sensor coil structure. Voltage detector 142 includes a sense resistor 144 that is coupled between first sensor coil 132 and second sensor coil 134. In the case where no net current is flowing in first sensor coil 132 and second sensor coil 134, no voltage develops across sense resistor 144. In a case where a net current is flowing in first sensor coil 132 and second sensor coil 134, for example when a foreign metal object is present on a transmitting surface (not shown in FIG. 1) of transmitter 100, a voltage develops across sense resistor 144. Voltage detector 142 rectifies and filters the voltage across sense resistor 144 to generate a DC signal that represents the magnitude of the net sensor voltage. Voltage detector 142 provides the signal that represents the magnitude of the net sensor voltage to controller 146. In one embodiment, controller 146 is a microcontroller; in other embodiments controller 146 is a microprocessor, an application specific integrated circuit (ASIC), or a field programmable gate array (FPGA). Controller 146 evaluates the magnitude of the net sensor voltage to determine whether a metallic foreign object such as a coin is present on the transmitting surface. In one embodiment, controller 146 compares the magnitude of the net sensor voltage to a predetermined threshold and if the magnitude of the net sensor voltage is greater than the predetermined threshold, controller 146 determines that a foreign object is present on the transmitting surface. If the magnitude of the net sensor voltage is not greater than the predetermined threshold, controller 146 determines that no foreign object is present on the transmitting surface. When controller 146 has determined that a foreign object is present on the transmitting surface, in one embodiment controller 146 sends a control signal to power circuit 128 to halt providing power to first transmitter coil 122 and second transmitter coil 124. In another embodiment, controller 146 sends an alarm signal to an output device (not shown) that generates a user-perceivable output (e.g., a sound, a flashing light, or a combination of audio, visual, and/or tactile output) to signal that a foreign object is present on the transmitting surface.

Figure 2:
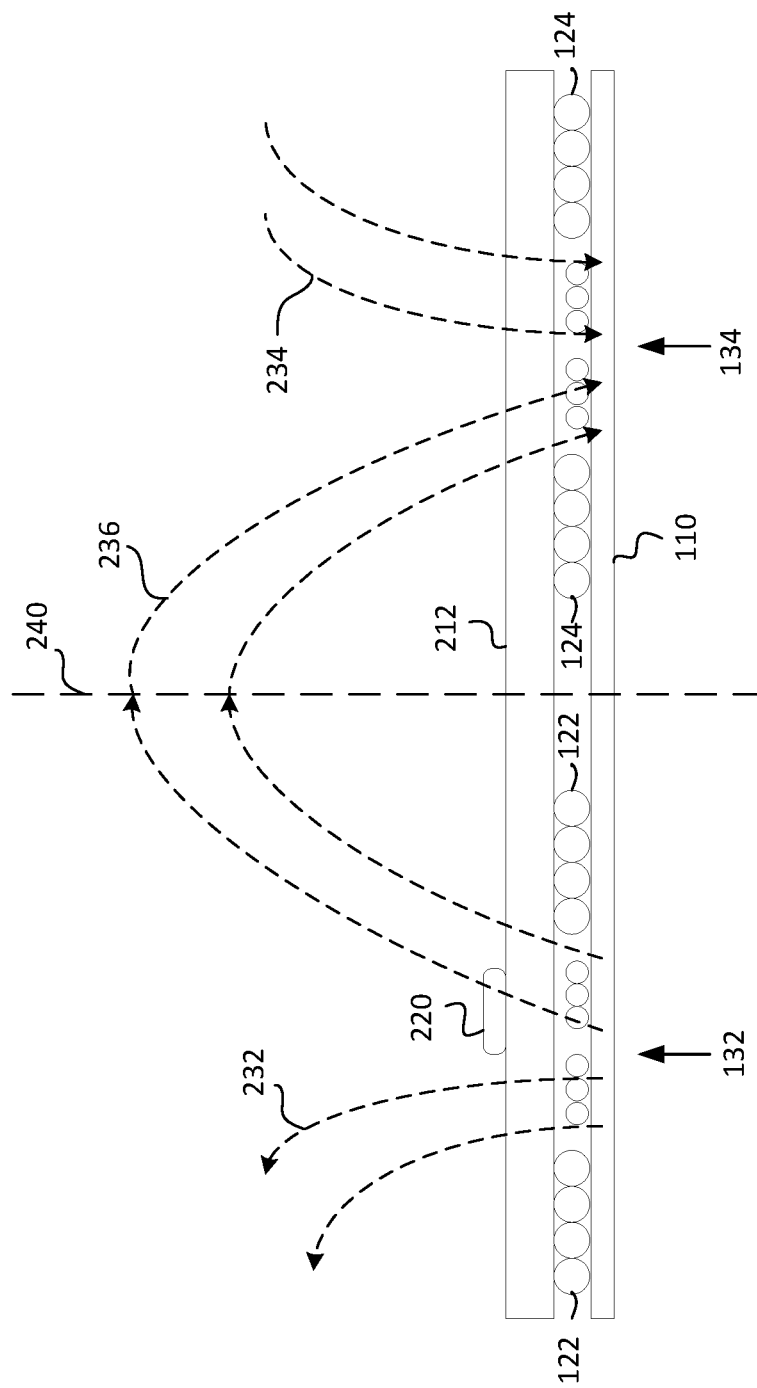
FIG. 2 is a cross-sectional diagram of one embodiment of a wireless transmitter coil structure and a foreign object sensor coil structure, according to the invention.

FIG. 2 is a cross-sectional diagram of one embodiment of a wireless transmitter coil structure and a foreign object sensor coil structure, according to the invention. First transmitter coil 122 and second transmitter coil 124 of the transmitter coil structure and first sensor coil 132 and second sensor coil 134 of the foreign object sensor coil structure underlie a transmitting surface 212. In one embodiment, transmitting surface 212 is made of a non-conducting material such as glass or plastic and is able to support at least one portable electronic device, for example a smartphone, tablet, or laptop. The pair of coils consisting of first transmitter coil 122 and first sensor coil 132 and the pair of coils consisting of second transmitter coil 124 and second sensor coil 134 are arranged symmetrically about an axis 240.

Current 152 flowing in first transmitter coil 122 generates a magnetic field represented by flux lines 232, which flow in an upward direction. Current 154 flowing in second transmitter coil 124 generates a magnetic field represented by flux lines 234, which flow in a downward direction. Because flux lines 232 and flux lines 234 flow in opposite directions, the magnetic reluctance between flux lines 232 and flux lines 234 is low, causing flux lines 232 and flux lines 234 between first coil 122 and second coil 124 to attract to each other. Flux lines 232 and flux lines 234 magnetically couple between first transmitter coil 122 and second transmitter coil 124 to form closed flux lines 236.

The magnetic field generated by first transmitter coil 122 induces a first sensor voltage in first sensor coil 132 and the magnetic field generated by second transmitter coil 124 induces a second sensor voltage in second sensor coil 134. First sensor coil 132 and second sensor coil 134 are coupled together in such a way (as shown in FIG. 1) that the first sensor voltage has a first polarity and the second sensor voltage has a second polarity that is opposite to the first polarity. When no foreign object is present on transmitting surface 212, the magnitude of the first sensor voltage of first sensor coil 132 is substantially equal to the magnitude of the second sensor voltage of second sensor coil 134 because each of first sensor coil 132 and second sensor coil 134 receives substantially the same amount of energy from the magnetic fields produced by first transmitter coil 122 and second transmitter coil 124. In most embodiments, the magnitudes of the first sensor voltage and the second sensor voltage will not be exactly equal when no foreign object is present due at least in part to slight differences between first sensor coil 132 and second sensor coil 134 (e.g., slightly different resistances or other manufacturing tolerances), any asymmetry between first sensor coil 132 and second sensor coil 134 with respect to axis 240, any asymmetry between the central axis of first sensor coil 132 and the central axis of first transmitter coil 122, and/or any asymmetry between the central axis of second sensor coil 134 and the central axis of second transmitter coil 124. The first sensor voltage and the second sensor voltage also may not be equal when no foreign object is present if a receiver coil of a receiving device is not located symmetrically with respect to axis 240. In one embodiment, a foreign object detection threshold is predetermined by detecting the magnitude of the net voltage across first sensor coil 132 and second sensor coil 134 (i.e., the net voltage across the foreign object sensor coil structure) when first transmitter coil 122 and second transmitter coil 124 are generating a magnetic field and it is known that no foreign object is present on transmitting surface 212.

A coin 220 located on transmitting surface 212 as shown in FIG. 2 receives a portion of the energy of the magnetic fields, causing eddy currents to flow in coin 220. The presence of coin 220 on transmitting surface 212 reduces the amount of energy of the magnetic field available to first sensor coil 132, with the result that the first sensor voltage induced in first sensor coil 132 will be less than it would otherwise be when coin 220 is not present. When coin 220 is present, the first sensor voltage induced in first sensor coil 132 will not be substantially equal to the second sensor voltage induced in second sensor coil 134. Voltage detector 142 (not shown in FIG. 2) detects a net voltage across first sensor coil 132 and second sensor coil 134 (i.e., the foreign object sensor coil structure). When a foreign object such as coin 220 is on transmitting surface 212, the magnitude of the net voltage across the foreign object sensor coil structure will be greater than the predetermined threshold that represents the net voltage magnitude when no foreign object is present.

Figure 3:
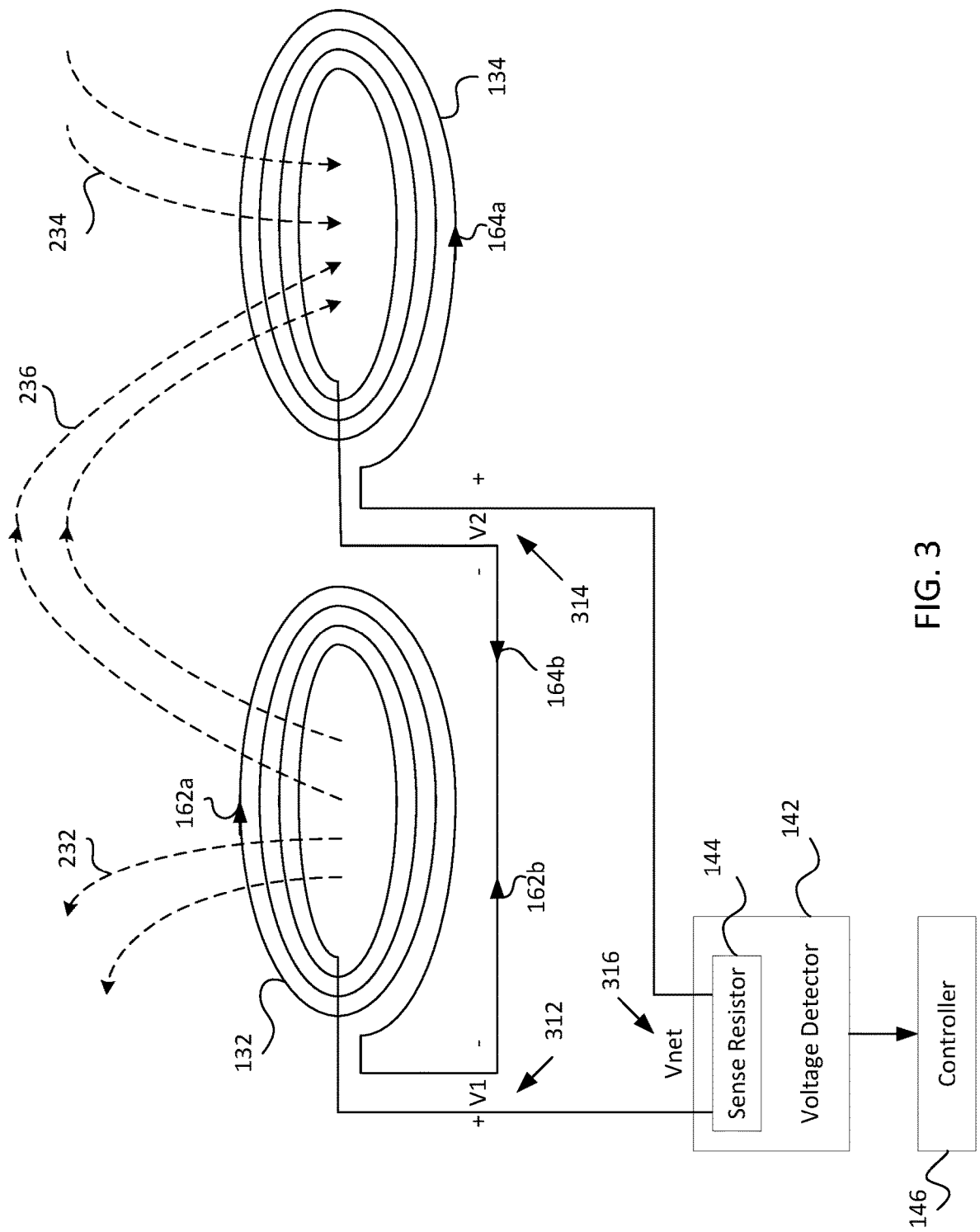
FIG. 3 is a diagram of one embodiment of a foreign object detection system, according to the invention.

FIG. 3 is a diagram of one embodiment of a foreign object detection system, according to the invention. The foreign object detection system of FIG. 3 is a sub-system of transmitter 100 of FIG. 1. A magnetic field represented by flux lines 232 and the upward flowing portions of flux lines 236 generated by first transmitter coil 122 (not shown in FIG. 3 for clarity) induces a first sensor voltage (V1) 312 in first sensor coil 132. First sensor voltage 312 causes induced current 162a to flow in first sensor coil 132. A magnetic field represented by flux lines 234 and the downward flowing portions of flux lines 236 generated by second transmitter coil 124 (not shown in FIG. 3 for clarity) induces a second sensor voltage (V2) 314 in second sensor coil 134. Second sensor voltage 314 causes induced current 164a to flow in second sensor coil 134. As shown in FIG. 3, first sensor coil 132 is coupled to second sensor coil 134 in such a way that first sensor voltage 312 and second sensor voltage 314 have opposite polarities at any given point in time. Voltage detector 142 detects a net voltage (Vnet) 316 that is the sum of first sensor voltage 312 and second sensor voltage 314, as first sensor coil 132 and second sensor coil 134 are coupled together in series. In one embodiment, voltage detector 142 presents a high impedance to the foreign object sensor coil structure so currents flowing in first sensor coil 132 and second sensor coil 134 will be very small (on the order of microamps). Voltage detector 142 rectifies and filters the voltage across sense resistor 144 to generate a DC signal that represents the magnitude of the net sensor voltage. In one embodiment, voltage detector 142 includes a diode bridge circuit to rectify the voltage across sense resistor 144 and a filter circuit to generate the DC signal appropriate to be input to controller 146.

When no metallic foreign object is present on a transmitting surface (not shown), first sensor coil 132 and second sensor coil 134 receive substantially the same amount of energy from the magnetic fields generated by the transmitter coil structure and the magnitude of first sensor voltage 312 and the magnitude of second sensor voltage 314 are approximately equal. Because at any given point in time first sensor voltage 312 and second sensor voltage 314 have opposite polarities, net voltage 316 will be a small value (e.g., close to zero) when no foreign object is present on the transmitting surface. At set forth above, in one embodiment, a threshold is predetermined by detecting the magnitude of net voltage 316 when first transmitter coil 122 and second transmitter coil 124 are generating a magnetic field and it is known that no foreign object is present on the transmitting surface. This threshold accounts for manufacturing tolerances of transmitter 100.

When a metallic foreign object such as a coin or key is present on the transmitting surface while the transmitter coils 122 and 124 are generating magnetic fields, the eddy currents that develop in the foreign object will reduce the amount of energy that one of first sensor coil 132 and second sensor coil 134 will receive from the magnetic fields. In such a case, the magnitudes of first sensor voltage 312 and second sensor voltage 314 will no longer be substantially equal and the magnitude of net voltage 316 will be greater than the predetermined threshold. Voltage detector 136 detects net voltage 316 and sends a signal representing the magnitude of net voltage 316 to controller 140. Controller 140 compares the magnitude of net voltage 316 to the predetermined threshold, and if the magnitude of net voltage 316 is greater than the predetermined threshold, controller 140 determines that a foreign object is present on the transmitting surface. In one embodiment, upon determining that a foreign object is present on the transmitting surface, controller 140 instructs power circuit 126 to halt providing power to the transmitter coil structure. In one embodiment, controller 140 also sends an alarm signal to an output device (not shown), which in response to the alarm signal generates a user-detectable output, for example a sound or a flashing light, to indicate that a foreign object is present on the transmitting surface.

Figure 4:
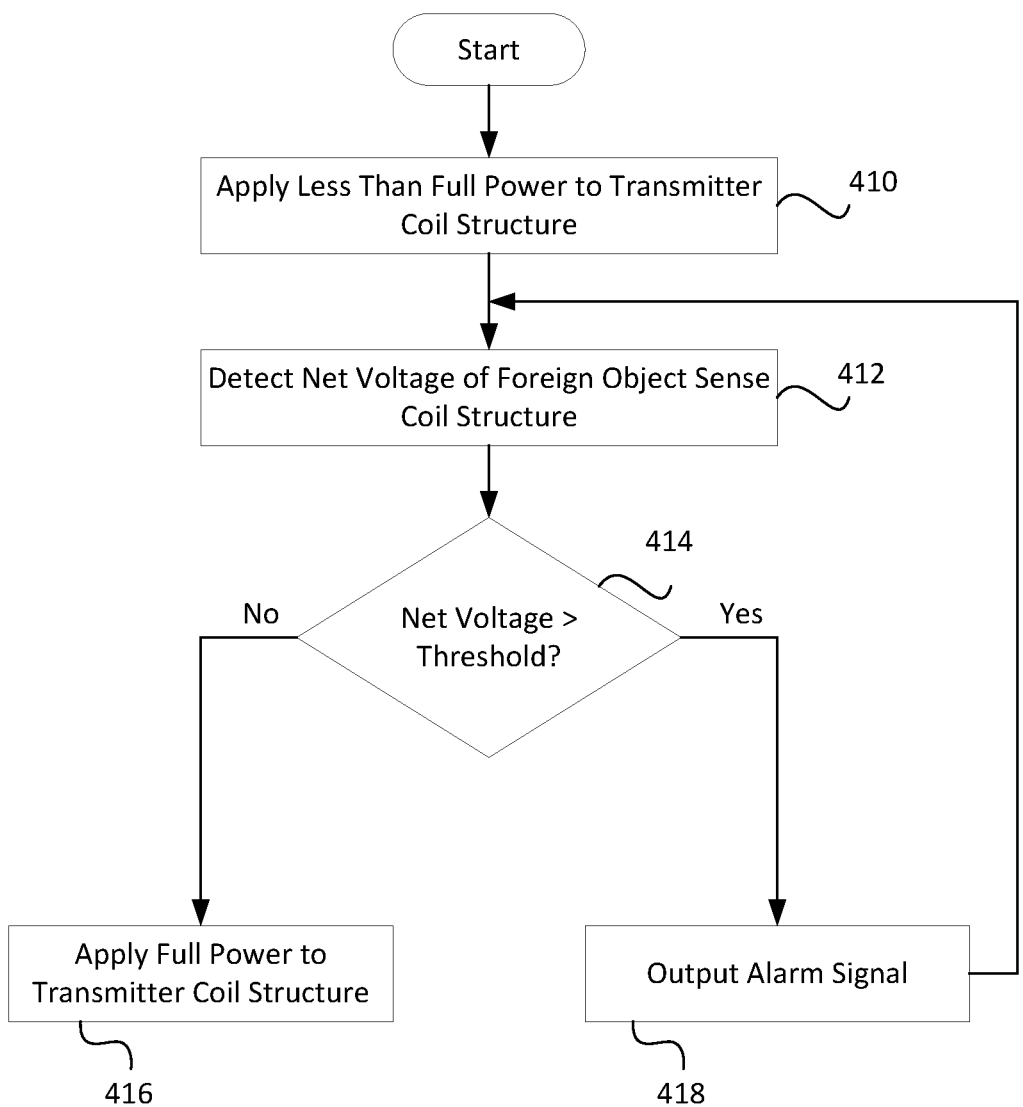
FIG. 4 is a flowchart of method steps for detecting a foreign object on a transmitting surface of a wireless power transmitter, according to one embodiment of the invention.

FIG. 4 is a flowchart of method steps for detecting a foreign object on a transmitting surface of a wireless power transmitter, according to one embodiment of the invention. In a step 410, controller 146 sends a control signal to power circuit 128 to apply less than full power to the transmitter coil structure (i.e., first transmitter coil 122 and second transmitter coil 124). In one embodiment, controller 146 causes power circuit 128 to apply a voltage with a predetermined magnitude that is less than the magnitude appropriate for wireless power transfer. In one embodiment, controller 146 causes power circuit 128 to apply a voltage with a gradually increasing magnitude up to a predetermined maximum value. Less than full power is initially applied to the transmitter coil structure in the FIG. 4 embodiment to enable detection of a possibly-present foreign object without the foreign object developing a potentially dangerous temperature. In a step 412, voltage detector 142 detects a net voltage across the foreign object sensor coil structure (i.e., first sensor coil 132 and second sensor coil 134). Voltage detector 142 then sends a signal that represents the magnitude of the net voltage to controller 146. In a step 414, controller 146 compares the magnitude of the net voltage to a predetermined threshold. If the magnitude of the net voltage is not greater than the predetermined threshold, then in a step 416 controller 146 determines that no foreign object is present and causes power circuit 128 to apply full power to first transmitter coil 122 and second transmitter coil 124. If the magnitude of the net voltage is greater than the predetermined threshold, then in a step 418 controller 146 determines that a foreign object is present and sends an alarm signal to an output device to cause the output device to generate a user-detectable alarm such as a sound or a flashing light. The method then returns to step 412 where voltage detector 142 continues to detect the net voltage across first sensor coil 132 and second sensor coil 134. In one embodiment, steps 412, 414, and 418 are repeated until the magnitude of the net voltage is less than the predetermined threshold (for instance if the foreign object is removed from the transmitting surface) or until a predetermined amount of time has expired. If the predetermined amount of time has expired, controller 146 then causes power circuit 128 to halt providing power to the transmitter coil structure.

Figure 5:
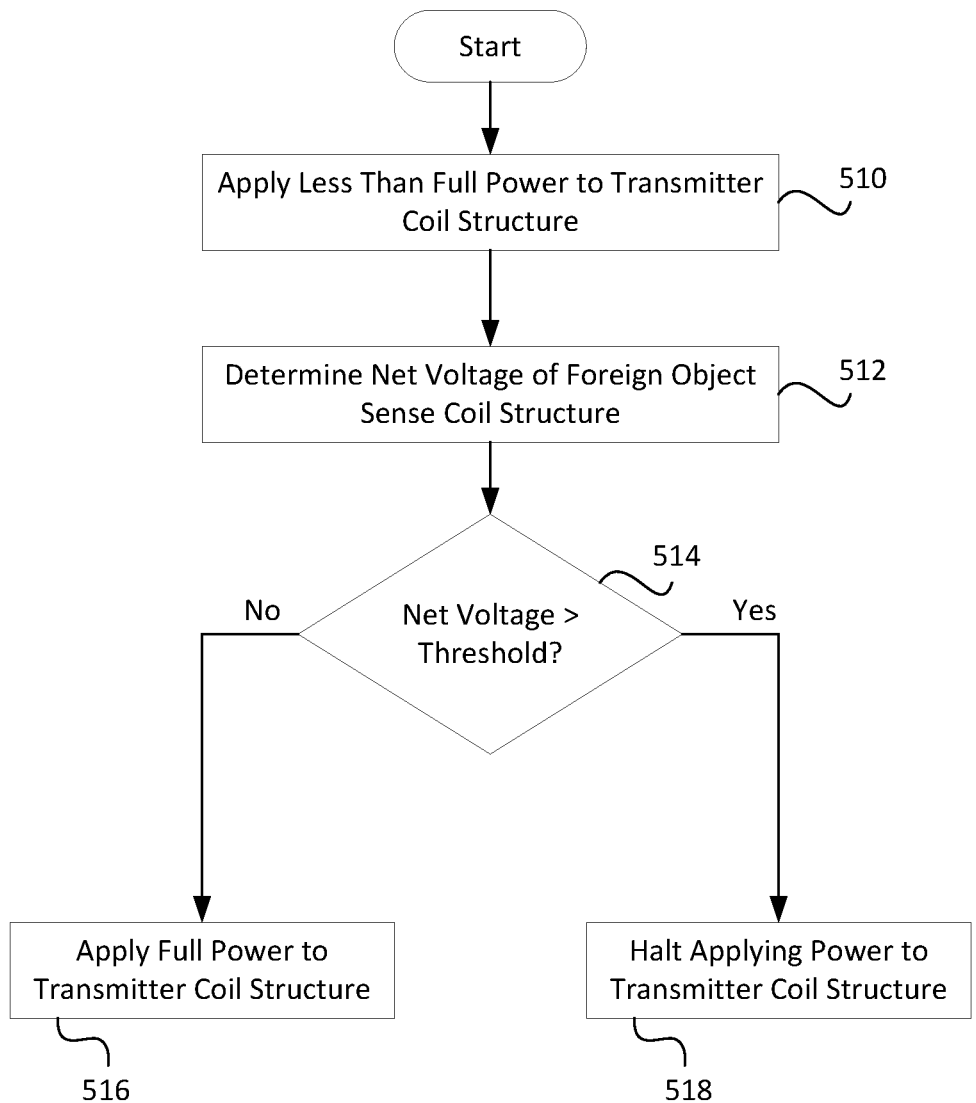
FIG. 5 is a flowchart of method steps for detecting a foreign object on a transmitting surface of a wireless power transmitter, according to one embodiment of the invention.

FIG. 5 is a flowchart of method steps for detecting a foreign object on a transmitting surface of a wireless power transmitter, according to one embodiment of the invention. In a step 510, controller 146 sends a control signal to power circuit 128 to apply less than full power to the transmitter coil structure (i.e., first transmitter coil 122 and second transmitter coil 124). In one embodiment, controller 146 causes power circuit 128 to apply a voltage with a predetermined magnitude that is less than the magnitude appropriate for wireless power transfer. In one embodiment, controller 146 causes power circuit 128 to apply a voltage with a gradually increasing magnitude up to a predetermined maximum value. In a step 512, voltage detector 142 detects a net voltage across the foreign object sensor coil structure (i.e., first sensor coil 132 and second sensor coil 134). Voltage detector 142 then sends a signal that represents the magnitude of the net voltage to controller 146. In a step 514, controller 146 compares the magnitude of the net voltage to a predetermined threshold. If the magnitude of the net voltage is not greater than the predetermined threshold, then in a step 516 controller 146 causes power circuit 128 to apply full power to first transmitter coil 122 and second transmitter coil 124. If the magnitude of the net voltage is greater than the predetermined threshold, then in a step 518 controller 146 causes power circuit 128 to halt providing power to the transmitter coil structure.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power transfer system comprising:
   a plurality of transmitter coils connected in series, each transmitter coil provided with a current and configured to generate magnetic flux lines that attract to those generated by at least one adjacent transmitter coil;
   a plurality of sensor coils connected in series, each configured to induce a voltage from the magnetic flux lines generated from the plurality of transmitter coils;

a voltage detector coupled to the plurality of sensor coils, the voltage detector configured to detect a net voltage across the plurality of sensor coils; and a controller configured to determine a presence or absence of an object on the wireless power transfer system based on a magnitude of the net voltage as detected by the voltage detector.

2. The wireless power transfer system of claim 1, further comprising:

a first transmitter coil of the plurality of transmitter coils, the first transmitter coil is configured to have a first current flow in the first transmitter coil in a first spatial direction; and a second transmitter coil of the plurality of transmitter coils, the second transmitter coil is configured to have a second current flow in the second transmitter coil in a second spatial direction different from the first spatial direction, wherein the first transmitter coil and the second transmitter coil are coupled together in series or in parallel.

3. The wireless power transfer system of claim 2, wherein the plurality of sensor coils comprises:

a first sensor coil of the plurality of sensor coils, the first sensor coil arranged in the system to have a first central axis in common with the first transmitter coil; and a second sensor coil of the plurality of sensor coils, the second sensor coil coupled in series to the first sensor coil, the second sensor coil arranged in the system to have a second central axis in common with the second transmitter coil.

4. The wireless power transfer system of claim 3, wherein the net voltage comprises a difference between a first voltage and a second voltage, the first voltage induced in the first sensor coil and having a first polarity, and the second voltage induced in the second sensor coil and having a second polarity different from the first polarity.

5. The wireless power transfer system of claim 1, wherein the controller is configured to determine the presence of the object when the magnitude of the net voltage is greater than a predetermined threshold and determine the absence of the object when the magnitude of the net voltage is not greater than the predetermined threshold.

6. The wireless power transfer system of claim 1, further comprising a power circuit coupled to the transmitter coil structure, the power circuit configured to provide power to the plurality of the transmitter coils.

7. The wireless power transfer system of claim 6, wherein the controller is further configured to cause the power circuit to halt providing power to the plurality of transmitter coils upon determining the presence of the object.

8. The wireless power transfer system of claim 1, further comprising an output device, and wherein the controller is further configured to cause the output device to generate a user-perceivable output upon determining the presence of the object.

9. The wireless power transfer system of claim 1, further comprising a transmitting surface overlying the plurality of transmitter coils and the plurality of sensor coils.

10. The wireless power transfer system of claim 1, wherein the voltage detector comprises a sense resistor coupled to the plurality of sensor coils.

11. The wireless power transfer system of claim 1, further comprising a layer of magnetic material underlying the plurality of transmitter coils and the plurality of sensor coils.

12. A method for detecting foreign objects on a wireless power transfer device comprising:

providing power to a plurality of transmitter coils connected in series, each transmitter coil provided with a current and configured to generate magnetic flux lines that attract to those generated by at least one adjacent transmitter coil;

detecting a net voltage across a plurality of sensor coils connected in series, each configured to induce a voltage from the magnetic flux lines generated from the plurality of transmitter coils;

comparing the net voltage across the plurality of sensor coils to a predetermined threshold voltage; and determining the presence or absence of an object based on a result of comparing the net voltage to the predetermined threshold voltage.

13. The method of claim 12, further comprising:

causing a first current to flow in a first transmitter coil of the plurality of transmitter coils in a first spatial direction; and causing a second current to flow in a second transmitter coil of the plurality of transmitter coils in a second spatial direction different from the first spatial direction, wherein the first transmitter coil and the second transmitter coil are coupled together in series or in parallel.

14. The method of claim 13, further comprising:

providing a first sensor coil of the plurality of sensor coils, the first sensor coil having a first central axis in common with the first transmitter coil; and providing a second sensor coil of the plurality of sensor coils, the second sensor coil coupled in series to the first sensor coil and having a second central axis in common with the second transmitter coil.

15. The method of claim 14, further comprising:

determining the net voltage as a difference between a first voltage and a second voltage, the first voltage induced in the first sensor coil and having a first polarity, and the second voltage induced in the second sensor coil and having a second polarity different from the first polarity.

16. The method of claim 12, wherein determining the presence of the object comprises determining that the net voltage is greater than the predetermined threshold.

17. The method of claim 12, wherein determining the absence of the object comprises determining that the net voltage is not greater than the predetermined threshold.

18. The method of claim 12, further comprising:

halting providing power to the plurality of transmitter coils in response to determining the presence of the object.

19. The method of claim 12, further comprising:

generating a user-perceivable output in response to determining the presence of the object.

* * * * *